US008127527B2

(12) United States Patent
Giffin

(10) Patent No.: US 8,127,527 B2
(45) Date of Patent: Mar. 6, 2012

(54) METHODS AND SYSTEMS FOR OPERATING OXIDIZER SYSTEMS

(75) Inventor: Rollin George Giffin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1256 days.

(21) Appl. No.: 10/994,709

(22) Filed: Nov. 22, 2004

(65) Prior Publication Data
US 2006/0107665 A1 May 25, 2006

(51) Int. Cl.
*F02K 3/00* (2006.01)
*F02K 7/00* (2006.01)
*F02K 9/00* (2006.01)
*F02K 99/00* (2009.01)

(52) U.S. Cl. .......................................... 60/224; 60/785
(58) Field of Classification Search ............ 60/772, 60/224, 782, 785
See application file for complete search history.

(56) References Cited

U.S. PATENT DOCUMENTS

| 3,887,146 A * | 6/1975 | Bright ........................ 244/12.1 |
| 4,004,413 A | 1/1977 | Ueno et al. |
| 4,223,530 A | 9/1980 | Kirner et al. |
| 4,391,290 A * | 7/1983 | Williams ...................... 137/81.1 |
| 5,048,597 A | 9/1991 | Bond |
| 5,101,622 A | 4/1992 | Bond |
| 5,131,225 A * | 7/1992 | Roettger ........................ 60/785 |
| 5,254,781 A * | 10/1993 | Calamur et al. ............... 585/500 |
| 5,761,896 A | 6/1998 | Dowdy et al. |
| 5,899,411 A * | 5/1999 | Latos et al. ................... 244/53 A |
| 6,092,360 A * | 7/2000 | Hoag et al. ........................ 60/783 |
| 6,119,985 A | 9/2000 | Clapp et al. |
| 6,148,609 A | 11/2000 | Provitola |
| 6,202,442 B1 * | 3/2001 | Brugerolle ...................... 62/649 |
| 6,226,980 B1 | 5/2001 | Katorgin et al. |
| 6,619,031 B1 | 9/2003 | Balepin |
| 6,735,951 B2 * | 5/2004 | Thompson ........................ 60/774 |
| 6,968,674 B2 * | 11/2005 | Wollenweber .................. 60/204 |
| 2002/0066267 A1 | 6/2002 | Breugelmans et al. |
| 2004/0025490 A1 | 2/2004 | Paul |
| 2004/0026572 A1 | 2/2004 | Burton |
| 2005/0097896 A1 * | 5/2005 | Critchley et al. ............... 60/776 |

FOREIGN PATENT DOCUMENTS

| GB | 2359876 | * 2/2001 |
| WO | WO-01/64513 A1 | 9/2001 |

OTHER PUBLICATIONS

European Search Report; App No. 05255852.5-2315; Dated Mar. 31, 2006; 8 pgs.
J. Andrews; AIAA 2000-5104 RLV Design Issues for Future Commercial Space Applications; Published by American Inst. of Aeronautis and Astronautics, Inc; Copyright 2000; 13 pgs.

(Continued)

*Primary Examiner* — Louis Casaregola
*Assistant Examiner* — Andrew Nguyen
(74) *Attorney, Agent, or Firm* — David J. Clement, Esq.; Armstrong Teasdale LLP

(57) ABSTRACT

A method and system for operating a gas turbine engine is provided. The system includes in serial flow arrangement, at least one compressor, a combustor, and at least one turbine. The method includes compressing atmospheric air in the gas turbine engine, channeling at least a portion of the compressed air from the turbine engine flowpath to an oxidizer supply system, and channeling an oxygen-depleted flow of the compressed air from the oxidizer supply system to the gas turbine engine flowpath.

18 Claims, 2 Drawing Sheets

OTHER PUBLICATIONS

W.H. Bond et al; Air Liquefaction and Enrichment System Propulsion in Reusable Launch Vehicles; Journal of Propulsion and Power; vol. 10, No. 4, Jul.-Aug. 1994; pp. 485-491.

Lourdes Q. Maurice et al.; Airbreathing Space Boosters Using In-Flight Oxidizer Collection; Journal of Propulsion and Power vol. 12, No. 2, Mar.-Apr. 1996; pp. 315-321.

Crocker, et al., "Progress on Alchemist Aces: Technology for Next Generation Space Transportation," AIAA 2003-4890, Jul. 20-23, 2003.

Crocker, et al., "ACES Propulsion Technology for Next Generation Space Transportation," IAC-03-S.5.03, Sep. 29-Oct. 3, 2003.

* cited by examiner

METHODS AND SYSTEMS FOR OPERATING OXIDIZER SYSTEMS

STATEMENT REGARDING FEDERALLY SPONSORED RESEARCH & DEVELOPMENT

The U.S. Government may have certain rights in this invention pursuant to task order NAS3-01135.

BACKGROUND OF THE INVENTION

This invention relates generally to gas turbine engines and, more particularly, methods and systems for operating oxidizer generating systems.

At least some known, multi-stage orbital space vehicles require large volumes of rocket fuel and oxidizer to be carried on-board. For example, the current space shuttle system uses a main tank section that includes liquid hydrogen and liquid oxygen tanks, and auxiliary solid rocket boosters. During operation, the main tank section and solid rocket boosters fall to earth after their fuel is expended and may only be reused after being recovered, and after being refurbished and tested. However, recovery, refurbishment, and testing of known fuel tanks may be a time-consuming and costly process.

Accordingly, at least some known next generation orbital launch systems contemplate using a vehicle that is capable of horizontal take-offs and horizontal landings. More specifically, some of such launch systems contemplate using a single stage vehicle powered by gas turbine engines during a portion of the flight and by a rocket propulsion system during a portion of the flight. However, such vehicles must carry an oxidizer onboard to supply the rocket propulsion system to enable orbital injection. The weight of the oxidizer may limit the mission capabilities of the vehicle.

BRIEF DESCRIPTION OF THE INVENTION

In one embodiment, a method for operating a gas turbine engine is provided. The system includes in serial flow arrangement, at least one compressor, a combustor, and at least one turbine. The method includes compressing atmospheric air in the gas turbine engine, channeling at least a portion of the compressed air from the turbine engine flowpath to an oxidizer supply system, and channeling an oxygen-depleted flow of the compressed air from the oxidizer supply system to the gas turbine engine flowpath.

In another embodiment, an oxidizer supply system is provided. The system includes a propulsive gas turbine engine, and an air-breathing non-propulsive gas turbine engine that includes a combustor, a low pressure compressor configured to compress atmospheric air from a first pressure to a second pressure, the second pressure being greater than the first, a high pressure compressor coupled downstream from and in flow communication with the low pressure compressor, the high pressure compressor is configured to direct a first portion of flow discharged therefrom to an air collection and enrichment system configured to generate liquid oxygen using the first portion of flow discharged from the high pressure compressor output, the high pressure compressor is further configured to direct a second portion of flow discharged therefrom to said combustor, and a low pressure turbine coupled in flow communication with the air collection and enrichment system such that a flow discharged from the air collection and enrichment system facilitates increasing a gas mass flow rate through the low pressure turbine.

In yet another embodiment, a propulsion system is provided. The propulsion system includes a propulsion gas turbine engine, and a compressor that is configured to receive and compress air for distribution to an air collection and enrichment system wherein the compressor is driven by a non-propulsive gas turbine engine and the air collection and enrichment system is configured to generate liquid oxygen using the compressed air and the non-propulsive gas turbine engine is configured to receive a flow of oxygen-depleted air from the air collection and enrichment system upstream of a combustor of the non-propulsive gas turbine engine.

DETAILED DESCRIPTION OF THE INVENTION

Figure 1:
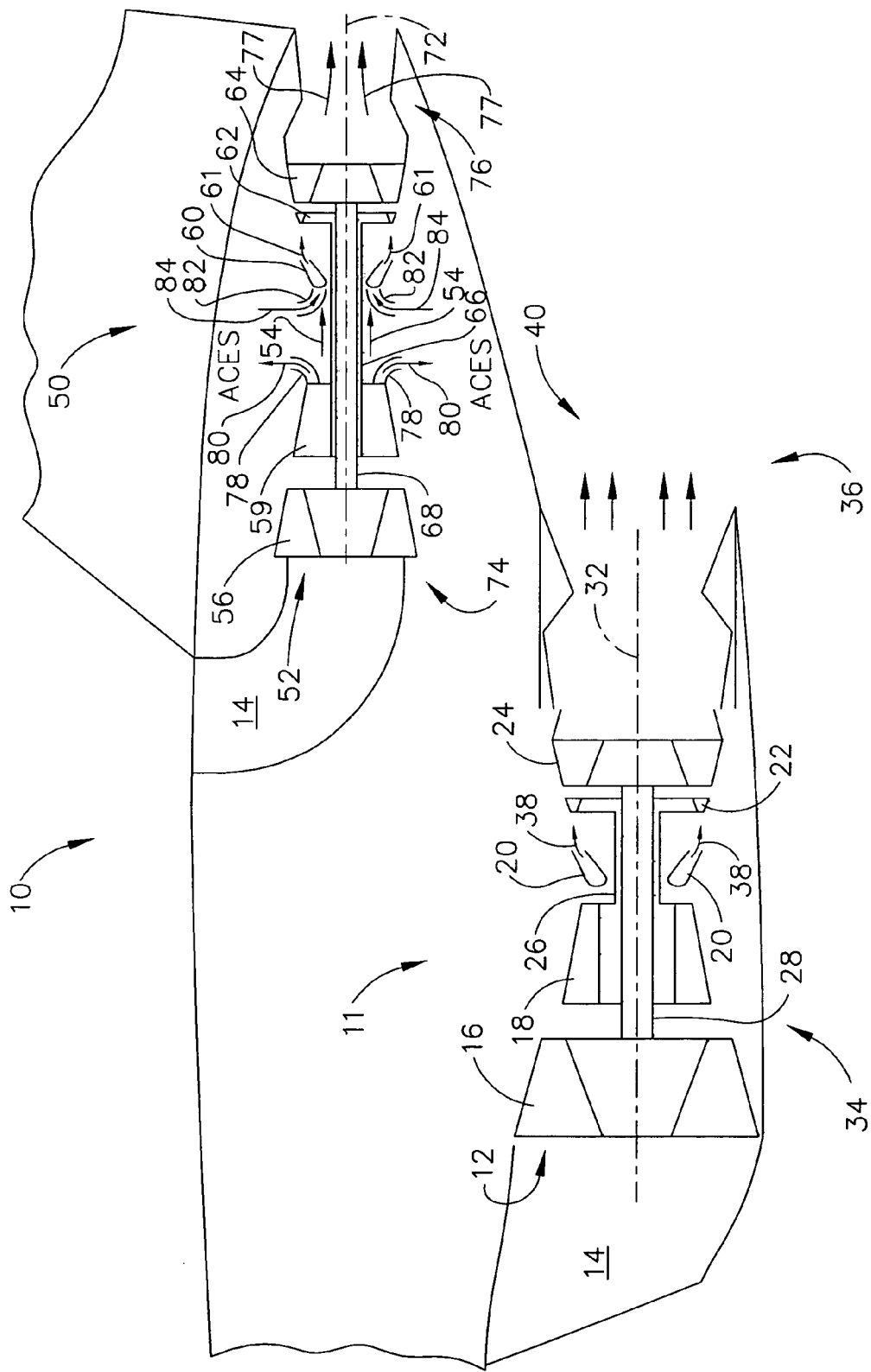
FIG. 1 is a schematic illustration of an exemplary oxidizer supply system that includes a gas turbine propulsion engine and an auxiliary gas turbine engine used to supply air to an ACES.

A single stage vehicle that is powered by gas turbine engines during horizontal take-offs, cruise, and horizontal landings and powered by a rocket propulsion system during a portion of the flight would not need to carry oxidizer onboard if the oxidizer could be gathered from the atmosphere during cruise flight. The oxidizer is used to supply the rocket propulsion system to enable orbital injection, however if carried onboard during take-off, the weight of the oxidizer may limit the mission capabilities of the vehicle. An air collection and enrichment system (ACES), such as the system described by Andrews Space, Inc. of Seattle, Wash. receives bypass air from a propulsive gas turbine engine during cruise flight, cools the air to distill the oxygen, and stores the oxygen for later use in oxidizing a rocket fuel during a rocket powered portion of the flight. The requirements for this system were formulated from the specifications of the air quantity and pressure level needed by Andrews-Space, Inc. to fulfil the vehicle mission goals FIG. 1 is a schematic illustration of an exemplary oxidizer supply system 10 that includes a gas turbine propulsion engine 11 and an auxiliary gas turbine engine 50. Gas turbine propulsion engine 11 includes, in serial flow communication, an inlet 12 for receiving ambient air 14, a fan 16, a high-pressure compressor 18, at least one combustor 20, a high pressure turbine 22, and a low pressure turbine 24. High pressure turbine 22 is coupled to high-pressure compressor 18 through a high pressure shaft 26, and low pressure turbine 24 is coupled to fan 16 through a low pressure shaft 28. Propulsion engine 11 has a longitudinal axis 32 extending from an upstream side 34 of propulsion engine 11 aft to an exhaust nozzle 36 of propulsion engine 11. In one embodiment, gas turbine propulsion engine 11 is a GE90 engine commercially available from General Electric Company, Cincinnati, Ohio.

In operation, air flows through fan 16 and compressed air is supplied to high-pressure compressor 18. Highly compressed air is delivered to combustor 20. Combustion gases 38 from combustor 20 propel turbines 22 and 24. High pressure turbine 22 rotates high-pressure shaft 26 and high pressure compressor 18, while low pressure turbine 24 rotates low pressure shaft 28 and fan 16 about longitudinal axis 32. Exhaust gases 40 exiting exhaust nozzle 36 provide thrust to drive gas turbine propulsion engine 11 forward.

Auxiliary gas turbine engine 50 includes, in serial flow communication, an inlet 52 for receiving ambient air 14, a first stage compressor or fan 56, a high pressure compressor 59, at least one combustor 60, a high pressure turbine 62, and a low pressure turbine 64. High pressure turbine 62 is coupled to high pressure compressor 59 through a high pressure shaft 66, and low pressure turbine 64 is coupled to fan 56 through a low pressure shaft 68. Auxiliary gas turbine engine 50 includes a longitudinal axis 72 extending from an upstream side 74 of auxiliary gas turbine engine 50 aft to an exhaust plenum 76 of auxiliary gas turbine engine 50. Auxiliary gas turbine engine 50 includes a core air bleed 78 that channels a first air portion 80 to an air collection and enrichment system (ACES) and an ACES return 82 that channels oxygen-depleted gas 84 from ACES to an inlet of combustor 60.

In operation of auxiliary gas turbine engine 50, air flows through fan 56 and compressed air is supplied to high pressure compressor 59. A first air portion 80 is bled from the output of high-pressure compressor 59 and directed to ACES. ACES receives first air portion 80, cools first air portion 80 to a temperature less than the boiling temperature of oxygen, for example, less than about minus one hundred eighty three degrees Celsius. At this temperature, liquid oxygen (LOX) distills out of the cooled air. The liquid oxygen is stored for later use, for example, as an oxidizer for a rocket motor (not shown). Oxygen-depleted gas 84 returning from ACES may be used regeneratively to pre-cool first air portion 80 entering ACES before being channeled through ACES return 82 to combustor 60. A second air portion 54 from high-pressure compressor 59, and oxygen-depleted gas 84 from ACES is channeled to combustor 60. Combustion gases 61 from combustor 60 propel turbines 62 and 64. High pressure turbine 62 rotates high pressure shaft 66 and high pressure compressor 59, while low pressure turbine 64 rotates low pressure shaft 68 and fan 56 about longitudinal axis 72. Exhaust gases 77 exit exhaust plenum 76 and are directed back to ambient 14. In the exemplary embodiment, auxiliary gas turbine engine 50 is configured to provide approximately five hundred fifty lbm per second of air at approximately three hundred sixty psia to ACES and sufficient core engine air to combustor 60 to maintain engine operation.

In the exemplary embodiment, ACES returns oxygen-depleted gas 84 to auxiliary gas turbine engine 50 between high-pressure compressor 59 and combustor 60. Typically, an ACES process may reduce the pressure of the air supplied to it to approximately 50 psi before channeling the air to auxiliary gas turbine engine 50. Because the pressure of the air between high-pressure compressor 59 and combustor 60 may be approximately three hundred sixty psia and the pressure of the returning oxygen-depleted gas 84 from ACES may be fifty psi or less, the pressure of oxygen-depleted gas 84 must be increased using a compressor for oxygen-depleted gas 84 in a gaseous state, or alternatively, if, ACES cools the oxygen-depleted gas 84 to a temperature less than approximately minus one hundred ninety six degrees Celsius it may be pumped as a liquid, which is simpler than compressing gaseous nitrogen back to approximately three hundred sixty psia.

Fan 56 and high pressure compressor 59 may be configured to increase the pressure of ambient air entering inlet 52 in stages from approximately nine psia to approximately three hundred sixty psia. Typically, fan 56 is configured to increase the engine ram pressure approximately fourfold from approximately nine psia to approximately thirty six psia and high pressure compressor 59 may be configured to increase the pressure tenfold from approximately thirty six psia to approximately three hundred sixty psia. Auxiliary gas turbine engine 50 may also be sized to provide approximately five hundred fifty lbm per second of air at three hundred sixty psia to ACES while supplying sufficient air to combustor 60 to maintain stable combustion.

Figure 2:
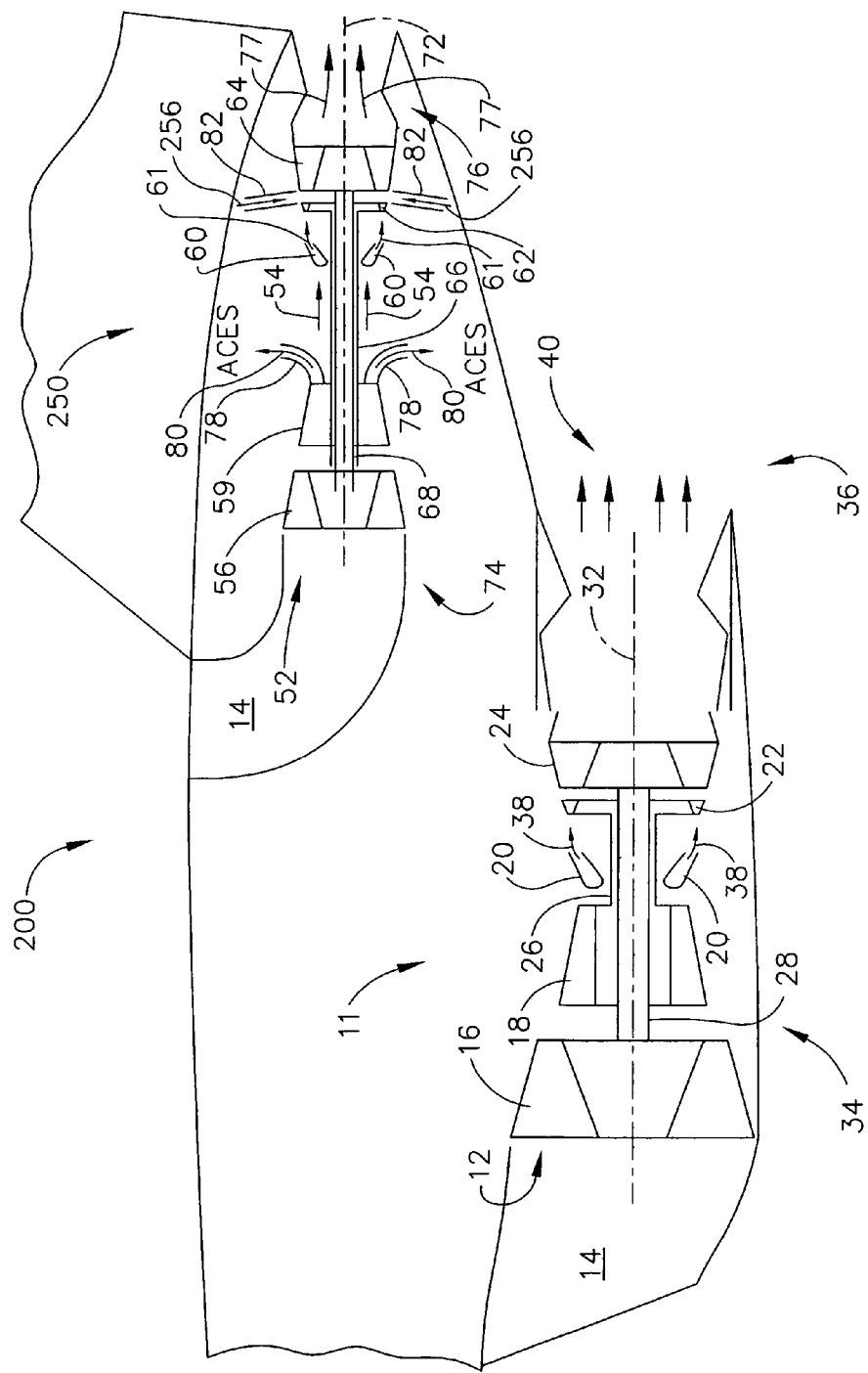
FIG. 2 is a schematic illustration of another exemplary oxidizer supply system that includes the gas turbine propulsion engine shown in FIG. 1 and an auxiliary gas turbine engine used to supply air to an ACES.

FIG. 2 is a schematic illustration of an exemplary embodiment of another oxidizer supply system 200 that includes gas turbine propulsion engine 11 (shown in FIG. 1) to provide propulsion power as described above and an auxiliary gas turbine engine 250. Auxiliary gas turbine engine 250 is substantially similar to auxiliary gas turbine engine 50 (shown in FIG. 1) and components in auxiliary gas turbine engine 250 that are identical to components of auxiliary gas turbine engine 50 are identified in FIG. 2 using the same reference numbers used in FIG. 1. Specifically, auxiliary gas turbine engine 250 includes, in serial flow communication, an inlet 52 for receiving ambient air 14, a first stage compressor or fan 56, a high pressure compressor 59, at least one combustor 60, a high pressure turbine 62, and a low pressure turbine 64. High pressure turbine 62 is coupled to high pressure compressor 59 through a high pressure shaft 66, and low pressure turbine 64 is coupled to fan 56 through a low pressure shaft 68. Auxiliary gas turbine engine 250 has a longitudinal axis 72 extending from an upstream side 74 of auxiliary gas turbine engine 250 aft to an exhaust plenum 76 of auxiliary gas turbine engine 250. Auxiliary gas turbine engine 250 includes a core air bleed 78 that channels a first air portion 80 to ACES and an ACES return 82 that channels oxygen-depleted gas 256 from ACES to an inlet of low pressure turbine 64.

In operation of auxiliary gas turbine engine 250, air flows through fan 56 and compressed air is supplied to high pressure compressor 59. A first air portion 80 is bled from the output of high-pressure compressor 59 and directed to ACES to provide a supply of high pressure air that is cooled to a temperature less than the boiling temperature of oxygen, for example, less than about minus one hundred eighty three degrees Celsius. The liquid oxygen distilled from first air portion 80 may be stored for later use, for example, as an oxidizer for a rocket motor. A second air portion 54 from high-pressure compressor 59 is channeled to combustor 60. Combustion gases 61 from combustor 60 propels turbines 62 and 64 and oxygen-depleted gas 84 returned from ACES is introduced upstream from turbine 64 through ACES return 82 and also propels turbine 64. High pressure turbine 62 rotates high pressure shaft 66 and high pressure compressor 59, while low pressure turbine 64 rotates low pressure shaft 68 and fan 56 about longitudinal axis 72. Exhaust gases 77 exiting low pressure turbine 64 are exhausted through plenum 76 and are directed back to ambient 14. In the exemplary embodiment, auxiliary gas turbine engine 250 is configured to provide approximately five hundred fifty lbm per second of air at approximately three hundred sixty psia to ACES and sufficient core engine air to combustor 60 to maintain engine operation. Accordingly, because auxiliary gas turbine engine 250 is configured to only supply high pressure air to ACES, rather than propulsive power, auxiliary gas turbine engine 250 may be sized substantially smaller than gas turbine propulsion engine 11.

In the exemplary embodiment, ACES returns cooled oxygen-depleted gas 256 to auxiliary gas turbine engine 250 between high pressure turbine 62 and low pressure turbine 64 to facilitate providing additional mass flow rate to increase the output power of auxiliary gas turbine engine 250. Cooled oxygen-depleted gas 84 may be used regeneratively to pre-cool first air portion 80 entering ACES before being returned to auxiliary gas turbine engine 250. While the ACES process may reduce the pressure of the air supplied to it to approximately 50 psi before returning the air to auxiliary gas turbine engine 250, the pressure of the combustion gases between high pressure turbine 62 and low pressure turbine 64 are approximately equal to or less than the pressure of the returning oxygen-depleted gas 84. Accordingly, further compressing of oxygen-depleted gas 84 or further cooling and pumping oxygen-depleted gas 84 is not needed for returning oxygen-depleted gas 84 to auxiliary gas turbine engine 250 between high pressure turbine 62 and low pressure turbine 64. As used herein "oxygen-depleted gas" may be an oxygen-reduced or oxygen-depleted gas or liquid that is returned from ACES after at least a portion of the oxygen has been distilled from the compressed air supplied to ACES.

The above-described compressed air supply methods and systems are cost-effective and highly reliable means for providing compressed air to a liquid oxygen generating process. In the exemplary embodiment, the liquid oxygen is generated onboard an aerospaceplane for use as an oxidizer in the aerospaceplane rocket engine. Generating liquid oxygen in-flight during cruising operations obviates the need to takeoff with a large amount of heavy oxidizer onboard. Accordingly, the compressed air supply methods and systems facilitates operation of space launch vehicles in a cost-effective and reliable manner.

Exemplary embodiments of compressed air supply system components are described above in detail. The components are not limited to the specific embodiments described herein, but rather, components of each system may be utilized independently and separately from other components described herein. Each compressed air supply system component can also be used in combination with other compressed air supply systems.

While the invention has been described in terms of various specific embodiments, those skilled in the art will recognize that the invention can be practiced with modification within the spirit and scope of the claims.

What is claimed is:

1. A method of operating an auxiliary gas turbine engine on an aircraft having a propulsion engine, said method comprising:
   providing an auxiliary gas turbine engine that is configured to be non-propulsive and includes, in serial flow arrangement, at least one compressor, a combustor, and at least one turbine;
   channeling ambient air into the auxiliary gas turbine engine during proper operation of the propulsion engine;
   compressing the ambient air in the auxiliary gas turbine engine;
   channeling at least a portion of the compressed air from the auxiliary gas turbine engine to an air collection and enrichment system; and
   channeling an oxygen-depleted flow of the compressed air from the air collection and enrichment system to the auxiliary gas turbine engine.

2. A method in accordance with claim 1 wherein said compressing the ambient air in the auxiliary gas turbine engine comprises compressing the ambient air in the auxiliary gas turbine engine using a low pressure compressor and a high pressure compressor.

3. A method in accordance with claim 1 wherein said channeling an oxygen-depleted flow of the compressed air from the air collection and enrichment system to the auxiliary gas turbine engine comprises regeneratively cooling the compressed air channeled from the auxiliary gas turbine engine to the air collection and enrichment system using the oxygen-depleted flow of the compressed air.

4. A method in accordance with claim 1 wherein channeling an oxygen-depleted flow of the compressed air from the oxidizer supply system comprises channeling the channeling the oxygen-depleted flow from the oxidizer supply system into the gas turbine engine flowpath between a high pressure turbine and a low pressure turbine.

5. A method in accordance with claim 1 wherein said channeling an oxygen-depleted flow of the compressed air from the air collection and enrichment system to the auxiliary gas turbine engine comprises channeling the oxygen-depleted flow of the compressed air into the auxiliary gas turbine engine between the at least one compressor and the combustor.

6. A method in accordance with claim 5 wherein said channeling an oxygen-depleted flow of the compressed air from the air collection and enrichment system to the auxiliary gas turbine engine further comprises increasing a pressure of the oxygen-depleted flow of the compressed air.

7. An oxidizer supply system for an aircraft having a propulsion engine, said oxidizer supply system comprising:
   an air collection and enrichment system configured to generate liquid oxygen; and
   a gas turbine engine configured to be non-propulsive and configured to operate using ambient air during proper operation of the propulsion engine, said gas turbine engine comprising:
      a combustor;
      a low pressure compressor configured to compress ambient air and discharge a flow of compressed air;
      a high pressure compressor coupled downstream from and in flow communication with said low pressure compressor, said high pressure compressor configured to further compress the flow of compressed air and discharge a first portion of the further compressed air to said air collection and enrichment system, said high pressure compressor further configured to discharge a second portion of the further compressed air to said combustor; and
      a turbine coupled in flow communication with said air collection and enrichment system, said air collection and enrichment system configured to discharge a flow of air to said turbine.

8. An oxidizer supply system in accordance with claim 7 wherein said high pressure compressor is further configured to discharge the first portion of the further compressed air to said air collection and enrichment system at a pressure from approximately three hundred psia to approximately four hundred psia.

9. An oxidizer supply system in accordance with claim 8 wherein said high pressure compressor is further configured to discharge the first portion of the further compressed air to said air collection and enrichment system at a pressure of approximately three hundred sixty psia.

10. An oxidizer supply system in accordance with claim 7 wherein said high pressure compressor is further configured to discharge the first portion of the further compressed air to said air collection and enrichment system at a mass flow rate from approximately five hundred lbm per second to approximately six hundred lbm per second.

11. An oxidizer supply system in accordance with claim 10 wherein said high pressure compressor is further configured to discharge the first portion of the further compressed air to said air collection and enrichment system at a mass flow rate equal to approximately five hundred and fifty lbm per second.

12. An oxidizer supply system in accordance with claim 7 wherein said air collection and enrichment system is configured to discharge at least a portion of the flow of air as a flow of oxygen-depleted air in at least one of a gaseous state and a liquid state to said combustor.

13. An oxidizer supply system in accordance with claim 7 wherein said non-propulsive gas turbine engine is configured to channel a flow of oxygen-depleted air in at least one of a gaseous and a liquid state from the air collection and enrichment system to said non-propulsive gas turbine engine flowpath upstream of said low pressure turbine.

14. A gas turbine engine for use on an aircraft having a propulsion engine, said gas turbine engine configured to be non-propulsive and configured to be coupled in flow communication with an air collection and enrichment system for generating liquid oxygen, wherein said gas turbine engine is configured to operate using ambient air during proper operation of the propulsion engine, said gas turbine engine comprising:
  a combustor;
  a compressor upstream of said combustor, said compressor configured to receive and compress ambient air for discharge to the air collection and enrichment system; and
  a turbine downstream of said combustor, at least one of said combustor and said turbine configured to receive a flow of oxygen-depleted air from the air collection and enrichment system.

15. A gas turbine engine in accordance with claim 14 wherein said compressor comprises a high pressure compressor.

16. A gas turbine engine in accordance with claim 14 wherein said compressor is configured to discharge compressed air at a pressure from approximately three hundred psia to approximately four hundred psia and at a mass flow rate from approximately five hundred lbm per second to approximately six hundred lbm per second.

17. A gas turbine in accordance with claim 16 wherein said compressor is configured to discharge compressed air at a pressure of approximately three hundred and sixty psia and at a mass flow rate of approximately five hundred and fifty lbm per second.

18. A propulsion system in accordance with claim 14 wherein the air collection and enrichment system channels a flow of oxygen-depleted air to a non-propulsive gas turbine engine flowpath defined between a high pressure turbine of said non-propulsive gas turbine engine and a low pressure turbine of said non-propulsive gas turbine engine.

* * * * *